US005642152A

United States Patent [19]
Douceur et al.

[11] Patent Number: 5,642,152
[45] Date of Patent: Jun. 24, 1997

[54] METHOD AND SYSTEM FOR SCHEDULING THE TRANSFER OF DATA SEQUENCES UTILIZING AN ANTI-CLUSTERING SCHEDULING ALGORITHM

[75] Inventors: John R. Douceur, Bellevue; William J. Bolosky, Issaquah, both of Wash.

[73] Assignee: Microsoft Corporation, Redmond, Wash.

[21] Appl. No.: 349,889

[22] Filed: Dec. 6, 1994

[51] Int. Cl.$^6$ ..................................................... H04N 7/14
[52] U.S. Cl. ..................................... 348/7; 348/12; 455/5.1
[58] Field of Search ................................. 348/7, 12, 13; 455/5.1; H04N 7/14

[56] References Cited

U.S. PATENT DOCUMENTS

| | | | |
|---|---|---|---|
| 5,341,474 | 8/1994 | Gelman et al. | 395/200 |
| 5,421,031 | 5/1995 | De Bey | 348/7 X |
| 5,475,615 | 12/1995 | Lin | 348/7 X |
| 5,561,456 | 10/1996 | Yu | 348/7 |
| 5,563,883 | 10/1996 | Cheng | 348/12 X |

FOREIGN PATENT DOCUMENTS 0 617 563  9/1994  European Pat. Off. ....... H04N 7/173

OTHER PUBLICATIONS

Yum, Tak-Shing and Ming Chen, "Dynamic Channel Assignment in Integrated-Services Cable Networks," *ICC-91 International Conference on Communications*, IEEE Communications Society and the Denver IEEE Section, Denver, U.S., Jun. 23-26, 1991, pp. 92-98.

Primary Examiner—John K. Peng
Assistant Examiner—John W. Miller
Attorney, Agent, or Firm—Seed and Berry LLP

[57] ABSTRACT

A scalable method and system is provided for scheduling data transfer of a video-on-demand server system. A strategy is provided for locating available bandwidth and allocating available bandwidth to subscribers as needed. The input/output bandwidth of storage devices that store data for video image sequences is modeled as a series of bandwidth units. The series of bandwidth units form a schedule where consumer requests are allocated to a bandwidth unit for receiving video image sequences. The bandwidth units are allocated to consumer requests according to an anti-clustering scheduling algorithm. By utilizing an anti-clustering scheduling algorithm, consumer requests less frequently incur an unacceptably long latency before receiving video image sequences.

27 Claims, 12 Drawing Sheets

METHOD AND SYSTEM FOR SCHEDULING THE TRANSFER OF DATA SEQUENCES UTILIZING AN ANTI-CLUSTERING SCHEDULING ALGORITHM

TECHNICAL FIELD

The present invention relates generally to data processing systems and, more particularly, to video-on-demand systems.

BACKGROUND OF THE INVENTION

Most conventional cable video systems provide subscribers with a number of different viewing choices. The different viewing choices are broadcast on separate channels, and a subscriber selects a viewing choice by tuning their television to the channel associated with the viewing choice. The number of viewing choices is limited by the number of available channels. An additional limitation in conventional cable video system is that the times at which the viewing choices begin are fixed.

One service provided in conventional cable video systems that has gained popularity is pay-per-view channels. Pay-per-view channels make available to subscribers selected viewing choices that start playing at fixed times. A subscriber contacts a cable station to request that he view a viewing choice that is being provided on a pay-per-view channel at a fixed time. The cable station responsible for programming the pay-per-view channel then switches the connection to the subscriber so that the viewer receives the broadcast of the requested viewing choice beginning at the designated start time. Different viewing choices are output on respective channels. One limitation to pay-per-view systems is that all subscribers must view a selected viewing choice at the same time. Video-on demand systems have been proposed that would solve this limitation. However, there are problems associated with video-on-demand systems.

SUMMARY OF THE INVENTION

In accordance with a first aspect of the present invention, a method is performed in a system for scheduling a request for a consumer to utilize a resource. In accordance with this first aspect of the present invention, the system has a schedule containing entries for servicing consumer requests. The method provides for determining a clustering indicator for each available entry in the schedule, selecting a clustering indicator with a least clusteriness of the schedule, and servicing the consumer request by the selected clustering indicator.

In accordance with a second aspect of the present invention, a scheduling mechanism is provided. The scheduling mechanism of the second aspect of the present invention comprises a resource, a list, a selecting component, and an allocating component. The resource is for servicing requests of consumers. The list has a plurality of entries for storing the requests of the consumers and has a clustering indicator which indicates the clusteriness of the schedule. The selecting component is for selecting an entry of the schedule to allocate to a request that will least effect the clustering indicator. The allocation component is for receiving a request from a consumer, for invoking the selecting component to select an entry, and for allocating the request to the selected slot of the schedule.

DETAILED DESCRIPTION OF THE INVENTION

Figure 1:
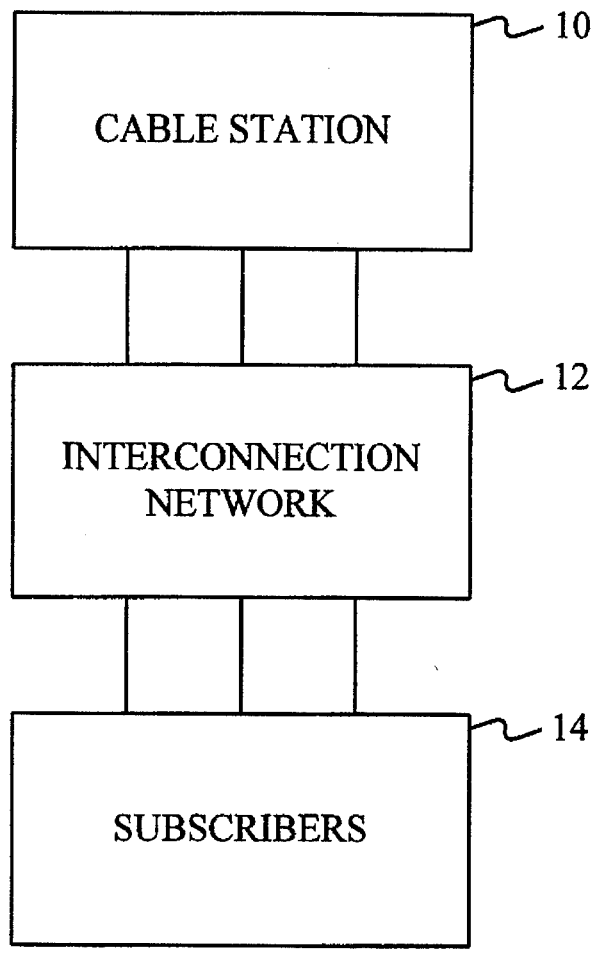
FIG. 1 is a block diagram of a video-on-demand system of a preferred embodiment of the present invention.

Embodiments of the present invention provide a scalable approach to scheduling of bandwidth on a video-on-demand server according to an anti-clustering scheduling algorithm. The scheduling is scalable in that the scheduling approach may be scaled easily to facilitate a changing number of video image sequences stored by the server and a changing number of subscribers requesting video image sequences. The anti-clustering scheduling algorithm (ASA) of the present invention is utilized to minimize the probability that the waiting time of a subscriber request will exceed a set limit. The preferred embodiment performs this by reducing the clusteriness of a schedule. In a schedule containing many entries for servicing subscriber requests for video image sequences, the term "clusteriness" refers to groups of contiguous entries which are allocated to subscriber requests. The present invention uses the ASA to allocate entries of the schedule to subscriber requests so as to reduce the clusteriness of the schedule. By utilizing the ASA, embodiments of the present invention reduce the chance that the latency incurred by a subscriber request will be very large. The "latency" incurred by a subscriber request refers to an amount of time that the subscriber request waits before receiving the requested video image sequences.

In order to more fully appreciate the present invention, it is necessary to contrast two scheduling algorithms for video-on-demand systems: the "greedy" scheduling algorithm and the ASA utilized by the present invention. The greedy scheduling algorithm allocates a subscriber request to the first available entry in the schedule after the entry currently being serviced. That is, a subscriber request is allocated to the temporally closest entry that does not already service a subscriber request. The greedy scheduling algorithm ensures that each subscriber request incurs the least possible latency. The greedy scheduling algorithm minimizes the mean latency of all subscribers by minimizing the latency time of each individual subscriber. However, as the schedule load increases (i.e., more entries in the schedule are allocated to subscriber requests), the latency incurred by subscriber requests becomes unacceptably high. This occurs because, as the schedule load increases, the schedule tends to have large groups of unavailable entries ("clusters"). Therefore, an allocation attempt for a subscriber request at the beginning of a cluster waits until the next available entry, which is at the end of the cluster. Depending on the size of the cluster, this can be an unacceptably long latency. In addition, since the next available entry after a cluster is allocated to a subscriber request, in utilizing the greedy scheduling algorithm, clusters have an inherent tendency to grow in size.

The ASA reduces the likelihood of unacceptable latencies occurring by allocating subscriber requests to entries in the schedule in a manner which reduces the tendency toward clustering. That is, the ASA allocates an available entry to a subscriber request which is temporally close and has a low probability of increasing the size of clusters in the schedule. In utilizing the ASA, since the entry which is selected for the subscriber is not necessarily the available entry which is as temporally close as possible to the entry which is currently being serviced, the latency for the subscriber request is not guaranteed to be minimized. Thus, latencies which would have been very small if the greedy scheduling algorithm had been employed are increased slightly by the ASA. In return, latencies which would have been very large if the greedy scheduling algorithm had been employed, due to the presence in the schedule of large clusters of unavailable entries, are decreased by the ASA, since the cluster size is reduced. Therefore, the present invention prevents subscribers from having to wait an unacceptably long period of time before receiving video image sequences.

The Video-On-Demand System

Bandwidth, as used in this context, is intended to refer to the aggregate input/output capacity (for a fixed time frame) of storage devices that hold data for video image sequences. For example, in a system having one storage device, the bandwidth would be the input/output capacity of the storage device. In the video-on-demand system of the present invention, the video image sequences are striped across many storage devices. Striping refers to storing sequential blocks of a video image sequence across sequential storage devices and is discussed in further detail below. Since bandwidth is defined in terms of the total system input/output capacity, the bandwidth of the system increases when the number of storage devices increases. Although the preferred embodiment will be described below. With reference to having the video image sequences striped across the storage devices, one skilled in the art will appreciate that the present invention may be used with data that is not striped. In addition, the video-on-demand system of the present invention will be described below relative to an implementation that concerns output bandwidth (i.e., reading data from storage devices holding video image sequences), but those skilled in the art will appreciate that the present invention may also be applied to input bandwidth as well (i.e., writing video image sequence data to storage devices).

Embodiments of the present invention are adapted for use in a video-on-demand server system like that shown in FIG. 1. The system depicted in FIG. 1 is a video-on-demand server system in which subscribers may request at any point in time to view particular video image sequences transmitted from the cable station 10. The cable station 10 transmits the data for the video image sequences over the interconnection network 12 to the subscribers 14. The interconnection network 12 may be any suitable interconnection mechanism, including an asynchronous transfer mode (ATM) network. Functionally, the interconnection network 12 acts like a crosspoint, banyan or other type of switch. The cable station 10 preferably makes available a large number of different video image sequences that may be transmitted to the subscribers 14 and viewed in real time. The data for the video image sequences may contain video data, audio data and other types of data, such as closed captioning data. Moreover, the present invention may be applied solely to audio data or other types of data sequences.

For such a video-on-demand server system, the choice of video image sequence viewed by a subscriber is not pre-scheduled. Viewing choices are scheduled upon subscriber demand. A subscriber need not choose a video image sequence that other subscribers are watching; rather, the subscriber may choose from any of the available video image sequences. Furthermore, each subscriber chooses when he wishes to start viewing a video image sequence. A number of different subscribers 14 may be concurrently viewing different portions of the same video image sequence. A subscriber may select where in a sequence he desires to start viewing and can stop watching a sequence before the entire sequence has been viewed.

Figure 2:
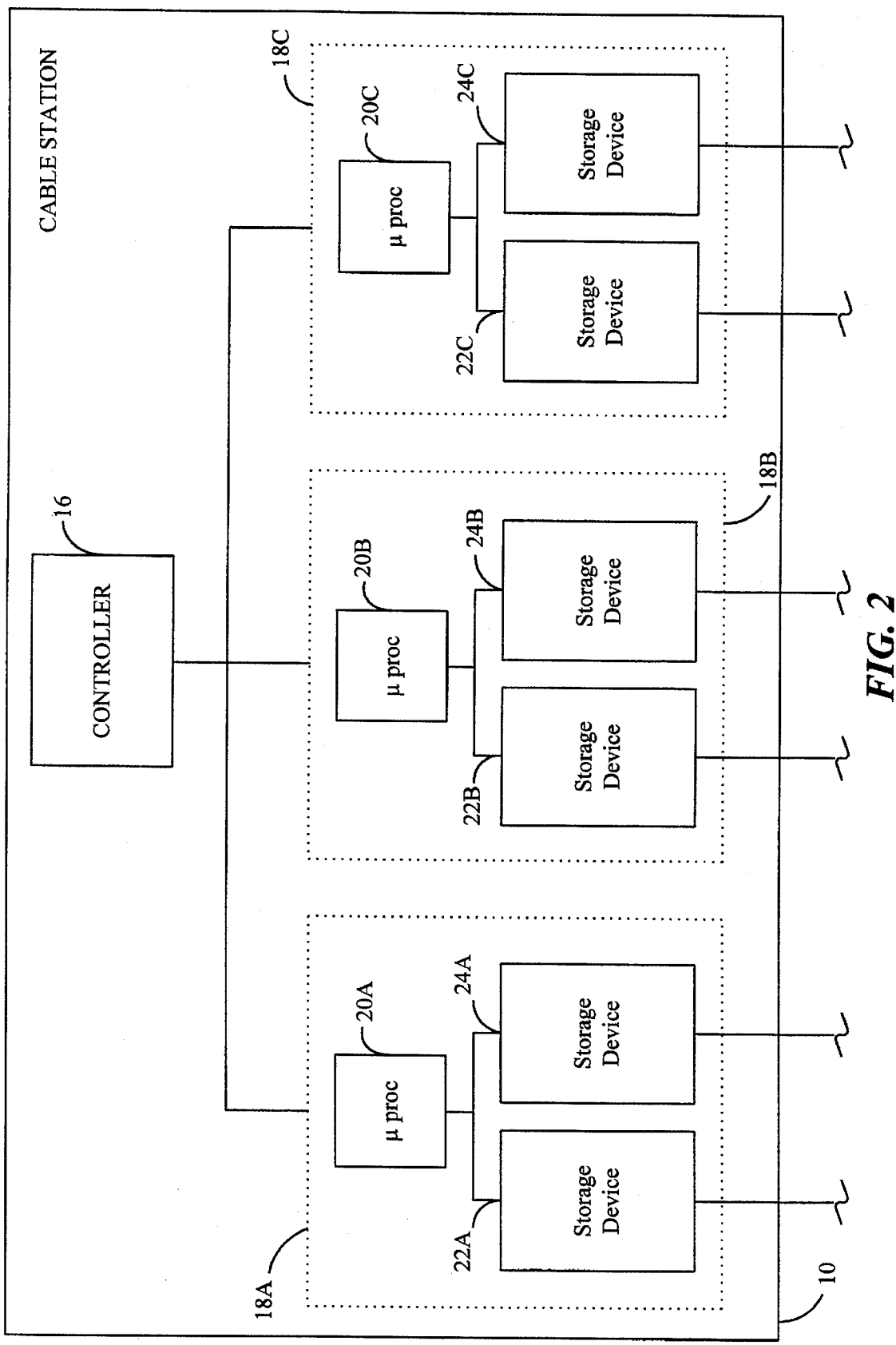
FIG. 2 is a more detailed block diagram of the cable station of FIG. 1.

FIG. 2 is a block diagram showing the cable station 10 in more detail. The cable station 10 acts as a video on-demand server. The cable station 10 includes a controller 16 that is responsible for scheduling transmission of video image sequences to subscribers 14 (FIG. 1). The controller 16 controls several subsystems 18A, 18B, and 18C and is responsible for scheduling and directing output from the subsystems to subscribers 14. The controller may be duplicated to provide a backup controller that enhances the fault tolerance of the system, or its function may be distributed among the several subsystems. Although only three subsystems are shown in FIG. 2, those skilled in the art will appreciate that, in most instances, it is more suitable to employ a larger number of subsystems. Only three subsystems are shown in FIG. 2 for purposes of simplicity and clarity.

Each subsystem 18A, 18B, and 18C includes a microprocessor 20A, 20B, and 20C that is responsible for controlling respective pairs of storage devices (22A, 24A), (22B, 24B) and (22C, 24C). The data for the video image sequences that are available to the subscribers 14 are stored on the storage devices 22A, 24A, 22B, 24B, 22C and 24C. Each subsystem 18A, 18B, and 18C need not include two storage devices, rather each subsystem may include only one storage device or may, alternatively, include more than two storage devices. The microprocessors 20A, 20B, and 20C are responsible for cooperating with the controller 16 to transmit the data for the video image sequences stored on the storage devices to the subscribers 14.

Storage devices 22A, 22B, 22C, 24A, 24B and 24C may be, for instance, magnetic disk drives or optical disk drives. Those skilled in the art will appreciate that any suitable storage device may be used for storing the data for the video image sequences. For instance, RAM, masked ROM, EPROM and flash EPROMs may be used to store the video image sequences in the present invention.

Figure 3:
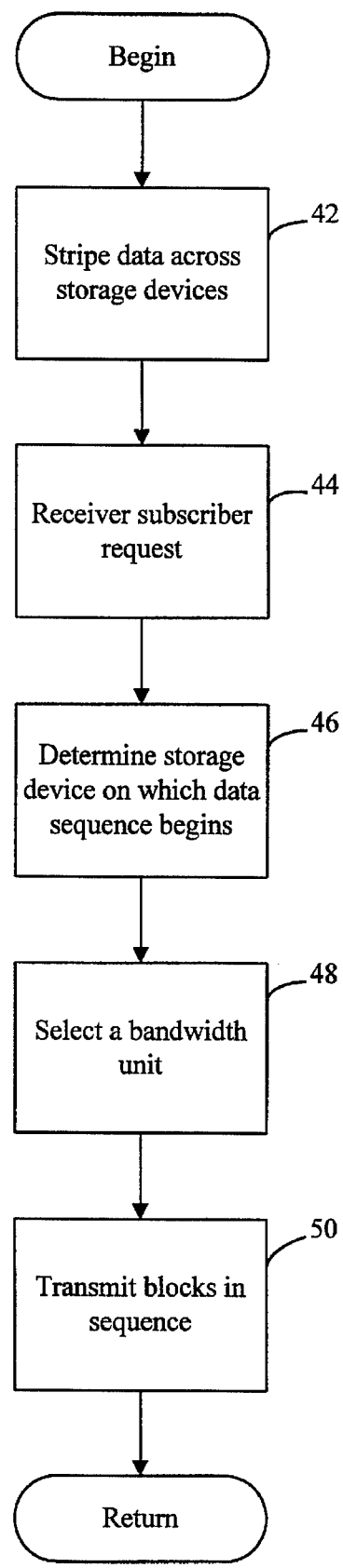
FIG. 3 is a flowchart providing a high level view of the steps performed by embodiments of the present invention.

FIG. 3 is a flowchart of steps performed by the embodiments of the present invention. Initially, video image sequences are stored across (i.e., striped) the storage devices 22A, 22B, 22C, 24A, 24B, and 24C (FIG. 2) of the video-on-demand server system (step 42 in FIG. 3). Multiple copies of a video image sequence may be stored in the cable station 10. This step is likely only performed once for each copy of a video image sequence stored in the cable station 10 and is not repeated for each subscriber. The motivation for striping the video data of the video image sequences is to increase the efficiency with which data is output by the storage devices in a bounded amount of time and to balance load requirements on each storage device.

Figure 4:
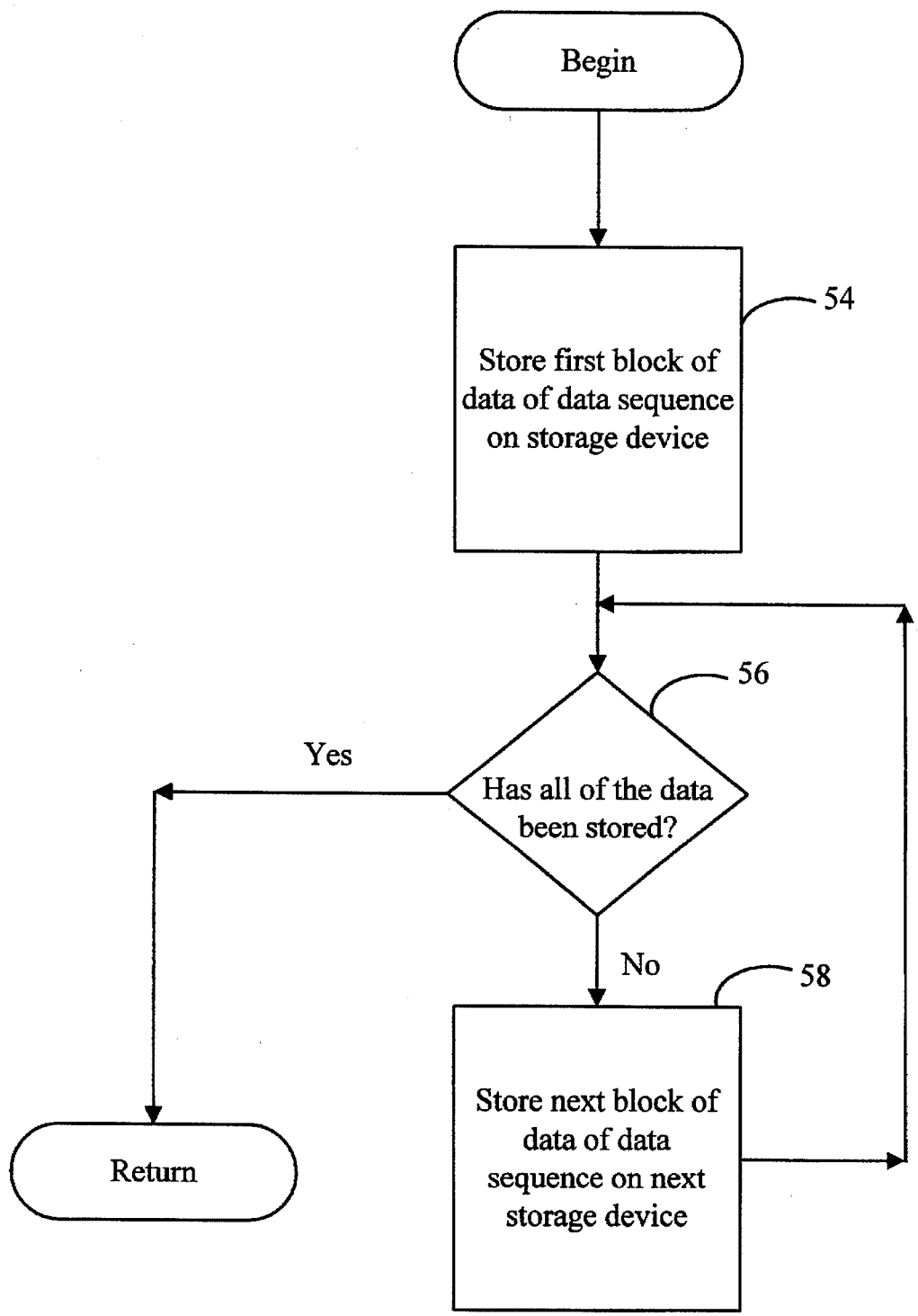
FIG. 4 is a flowchart illustrating in more detail how video image sequences are stored in embodiments of the present invention.

FIG. 4 is a flowchart showing the steps performed by embodiments of the present invention to stripe the video image sequences across the storage devices 22A, 22B, 22C, 24A, 24B and 24C (i.e., to perform step 42 of FIG. 3). The first block of a video image sequence is stored on a designated storage device (step 54). As mentioned above, it should be appreciated that more than one copy of a video image sequence may be striped across the storage devices. As such, there may be more than one storage device upon which each block of the video image sequence is stored. Block size is variable, but typically, a block includes 64 kilobytes to 4 megabytes of data. Block size is bounded by an upper limit that may not be exceeded. After the first block of the video image sequence has been stored on the designated storage device, a determination is made if all of the blocks of data for the video image sequence have already been stored on the storage devices (step 56). If not, the next block of data for the video image sequence is stored on a next storage device in a predetermined sequence of storage devices (step 58). Each consecutive block of data for the video image sequence is stored on a next storage device in the predetermined sequence. Steps 56 and 58 are then repeated until all of the data for the video image sequence has been stored across the storage devices. The predetermined sequence is treated as being circular. That is, the predetermined sequence wraps around to the beginning when the end of the sequence is reached. As a result of this process, the data for the video image sequence is striped across the storage devices. The steps shown in FIG. 4 are performed for each video image sequence that is stored in the system of the present invention.

After the completion of step 42 in FIG. 3 of storing the video image sequence, the cable station 10 receives a subscriber request to view a video image sequence (step 44). In response to the subscriber request, embodiments of the present invention determine how to exploit the available output bandwidth to service the subscriber's request. The first step in exploiting the available bandwidth is determining the drive on which the initial block to be viewed in the video image sequence is stored (step 46). If the subscriber is viewing the video image sequence from the beginning of the sequence, the initial block is the first block in the sequence. However, where the subscriber desires to view the video image sequence beginning at some intermediate point, the initial block is the first block that the subscriber desires to view. Embodiments of the present invention maintain a record (described in more detail below) of the storage devices on which each of the available video image sequences begins and more generally, has sufficient knowledge to locate the initial block to be viewed by the subscriber. This information is utilized to perform step 46 of FIG. 3.

Once the storage device that holds the initial block of the requested video image sequence to be viewed has been identified (i.e., step 46), embodiments of the present invention select a bandwidth unit that may be used to transmit the video data of the requested video image sequence to the requesting subscriber (step 48). The bandwidth unit is the unit of allocation of bandwidth of the video-on-demand system of the present invention. Scheduling for each storage device is done on a column of time slots. Each column including a number of time slots in a sequence that repeats.

Each time slot is a bounded period of time that is sufficient for the storage device to output a block of data. A bandwidth unit comprises a time slot from each column of time slots. Each time slot in the bandwidth unit is associated with a different storage device that outputs a block of data of a video image sequence. Since the blocks of data are striped across the storage device, consecutive blocks of data are read from the predetermined sequence of storage devices during the sequence of time slots of the bandwidth unit. The time slots are generated by the controller 16 or other suitable mechanism (FIG. 2).

Figure 5:
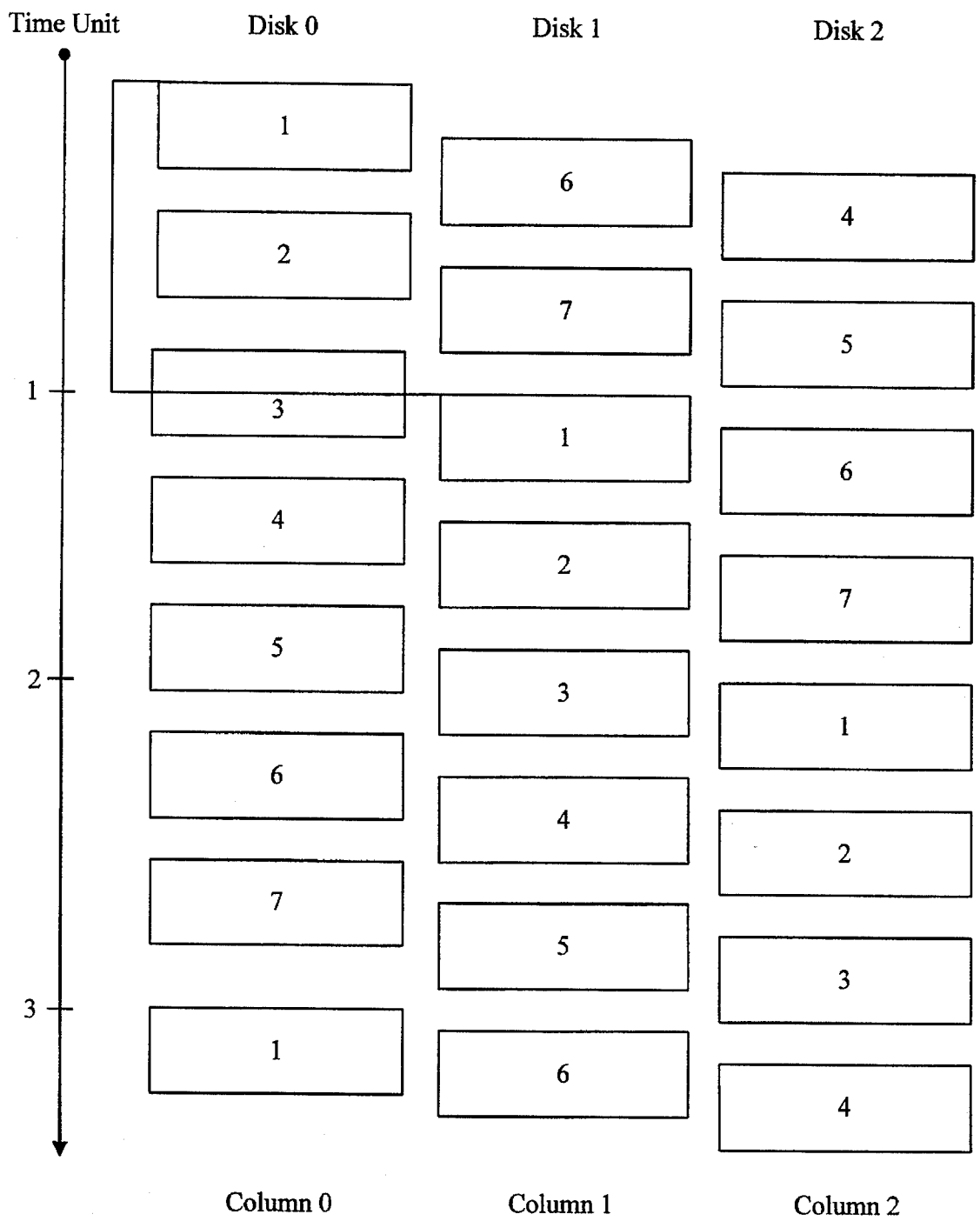
FIG. 5 is a diagram illustrating the scheduling of bandwidth in a three disk drive system in accordance with embodiments of the present invention.

The notions of a column of time slots and a bandwidth unit can perhaps best be explained by way of example. Subscribers are scheduled by bandwidth unit. In other words, they are granted the same numbered time slot in each column. FIG. 5 shows the scheduling of seven subscribers for three storage devices (e.g., disk 0, disk 1 and disk 2). The rectangles shown in FIG. 5 are time slots. The numbers 1–7 in FIG. 5 correspond to the time slot in the respective columns 0, 1 and 2. Time slots of a common bandwidth unit all have the same number. This is further described below. Columns 0, 1 and 2 are all offset temporally relative (i.e., time unit in FIG. 5) to each other, but each column has the same sequence of time slots. As can be seen in FIG. 5, disk drive 0 services each of the subscribers in sequence beginning with the subscriber who has been allocated logical unit of bandwidth 1. In the example of FIG. 5, bandwidth unit 1 includes the time slots labeled 1 in columns 0, 1 and 2. During the slot 1 of column 1, disk drive 0 begins outputting a block of data for a video image sequence to a first subscriber that has been assigned bandwidth unit 1. One time unit later, disk drive 1 outputs the next block of data to the first subscriber during time slot 1 of column 1. Further, at time unit 2, disk drive 2 outputs the next block of data for the video image sequence to the subscriber during time slot 1 of column 2. The predefined sequence of storage devices in this example is disk drive 0, disk drive 1 and disk drive 2, with the sequence wrapping back around to disk drive 0 from disk drive 2. As mentioned above, the system in step 48 of FIG. 3, selects a free bandwidth unit that may be allocated to a subscriber to transmit the desired video image sequence to the subscriber by utilizing the ASA. In particular, the system selects a free time slot on the storage device that holds the initial block to be viewed of the video image sequence. This step is described in more detail below. The scheduling in the other columns follows in lock step with the scheduling of the column for this storage device.

Once the selected bandwidth unit is found, the subscriber is assigned the free bandwidth unit and the blocks of data of the video image sequence are transmitted in sequence (step 50 in FIG. 3). The cycle is repeated until all the data is output or until the user requests to stop viewing the video image sequence. It should be appreciated that scheduling may be dynamic such that over time users may enter and leave the system and users may start and stop viewing video image sequences. Moreover, it should be appreciated that steps 44, 46, 48 and 50 are performed on a per-subscriber basis. Thus, the subscriber receives the desired data.

The Anti-Clustering Scheduling Algorithm

Figure 6:
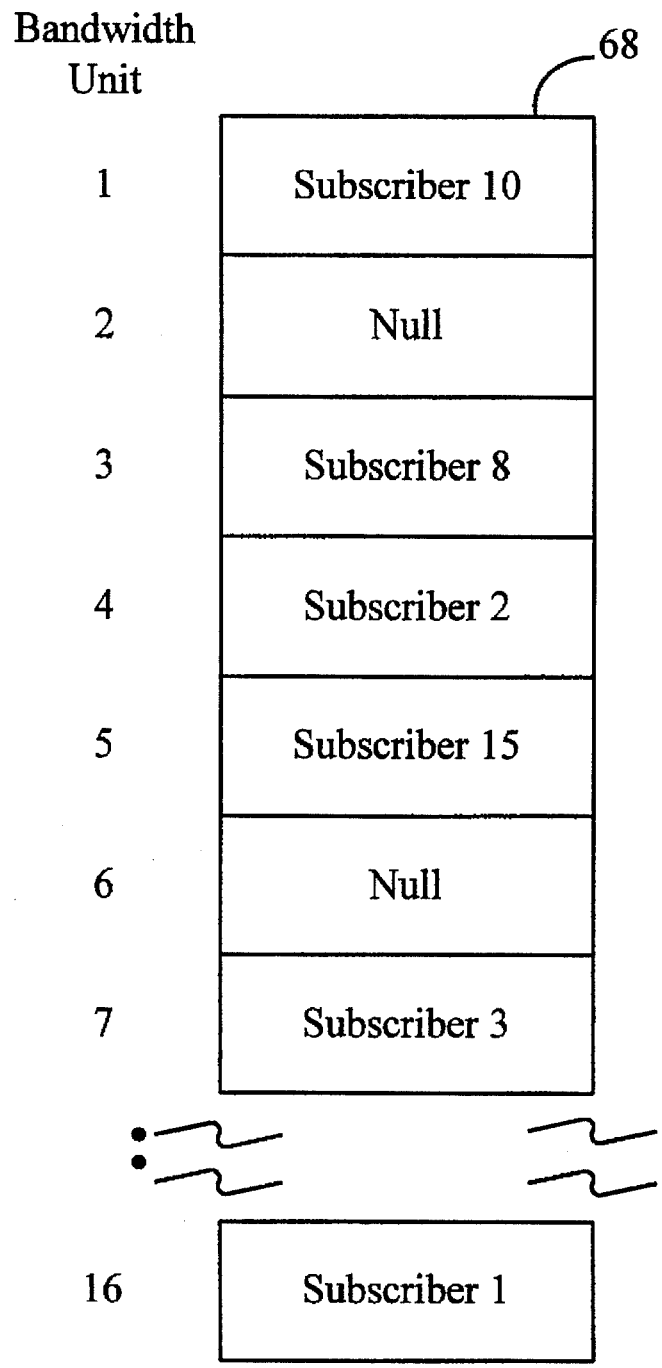
FIG. 6 is a diagram illustrating an example data structure that is maintained in embodiments of the present invention.

Before delving into the steps performed by the ASA of the present invention to select a free bandwidth unit, it is helpful to first introduce a data structure maintained by the system to assist in monitoring bandwidth units. In particular, the system maintains a data structure 68 such as an array, linear list or tree (FIG. 6) for each of the logical units of bandwidth in the system. An entry is provided in the data structure 68 for each of the bandwidth units. The data structure may be stored in memory or some other devices, and may be distributed among more than one component of the system. In the example shown in FIG. 6, there are 16 bandwidth units. Each entry holds either a pointer to the subscriber that is currently allocated the bandwidth unit (i.e., unavailable) or a null pointer, which indicates that the bandwidth unit has not yet been allocated (i.e., available). This structure may alternatively be viewed as holding an assignment of time slots to subscribers since each column of time slots follows the same sequence.

Figure 7:
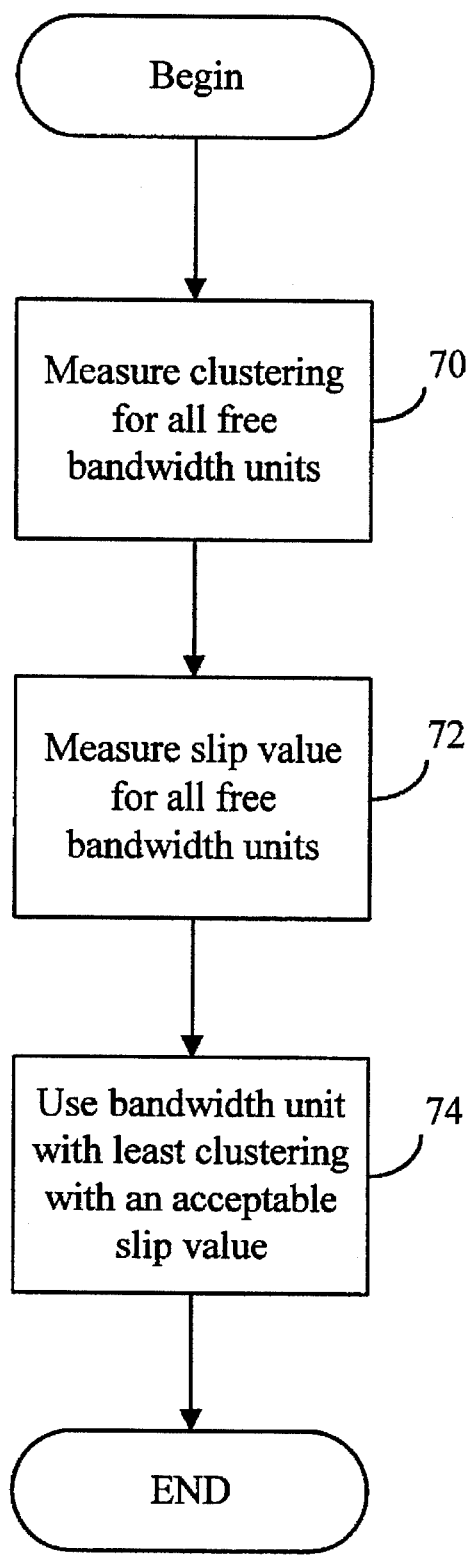
FIG. 7 is a high-level flowchart illustrating the steps performed by the anti-clustering algorithm of the present invention.

FIG. 7 depicts a flowchart illustrating the steps performed at a high level by the anti-clustering scheduling algorithm of the present invention. The anti-clustering scheduling algorithm of the present invention utilizes a clustering metric (or indicator). The clustering metric is an indication of the clusteriness of the data structure 68 ("the schedule"). The clustering metric is calculated by determining all groups of contiguous available bandwidth units and all groups of contiguous unavailable bandwidth units in the schedule. For each group of contiguous available bandwidth units or contiguous unavailable bandwidth units containing "k" bandwidth units within the group, the following formula is used to create an intermediate value for each group to be used in calculating the clustering metric.

$$v(k) = \sum_{a=1}^{k} a \equiv \frac{k(k+1)}{2}$$

Where "v(k)" is an intermediate value for a group of contiguous available bandwidth units or a group of contiguous unavailable bandwidth units. After calculating "v(k)" for each group, the clustering metric for the schedule is calculated by adding all intermediate values together. The first step performed by the ASA of the present invention is to measure the clustering metric for all free bandwidth units (step 70). In this step, the clustering metric is calculated for the schedule as if the subscriber request were allocated to each of the free bandwidth units. Next, the ASA measures the slip value for each free bandwidth unit (step 72). The "slip value" is expressed in units of bandwidth units and is the latency incurred by a subscriber request if allocated to the bandwidth unit. The slip value will be discussed in more detail below. The ASA then chooses the bandwidth unit with the clustering metric with the lowest value ("lowest clustering metric") that also has an acceptable slip value. An acceptable slip value is chosen off-line by the developers and/or operators of the video-on-demand system based on what subscribers consider to be acceptable. Therefore, the anti-clustering scheduling algorithm reduces the likelihood that subscriber requests incur unacceptable latencies. Although the steps of FIG. 7 have been described in a specific order, one skilled in the art will appreciate that different orderings of the steps can be used by the present invention. For example, steps 70 and 72 can be reversed in order or executed concurrently.

Although the ASA of the present invention is described relative to allocating bandwidth units to subscriber requests, one skilled in the art will appreciate that the ASA of the present invention can be used in any system having a resource and consumers wherein the consumers make requests to utilize the resource and the requests are scheduled. In this sense, the term "consumer" refers to any entity that makes requests to utilize a resource or is scheduled by the resource. Such consumers may include computers, programs, processes, or users. Such resources may include programs, processes, libraries, microprocessors, primary storage devices, secondary storage devices, networks, or other hardware or software entities.

Figure 8:
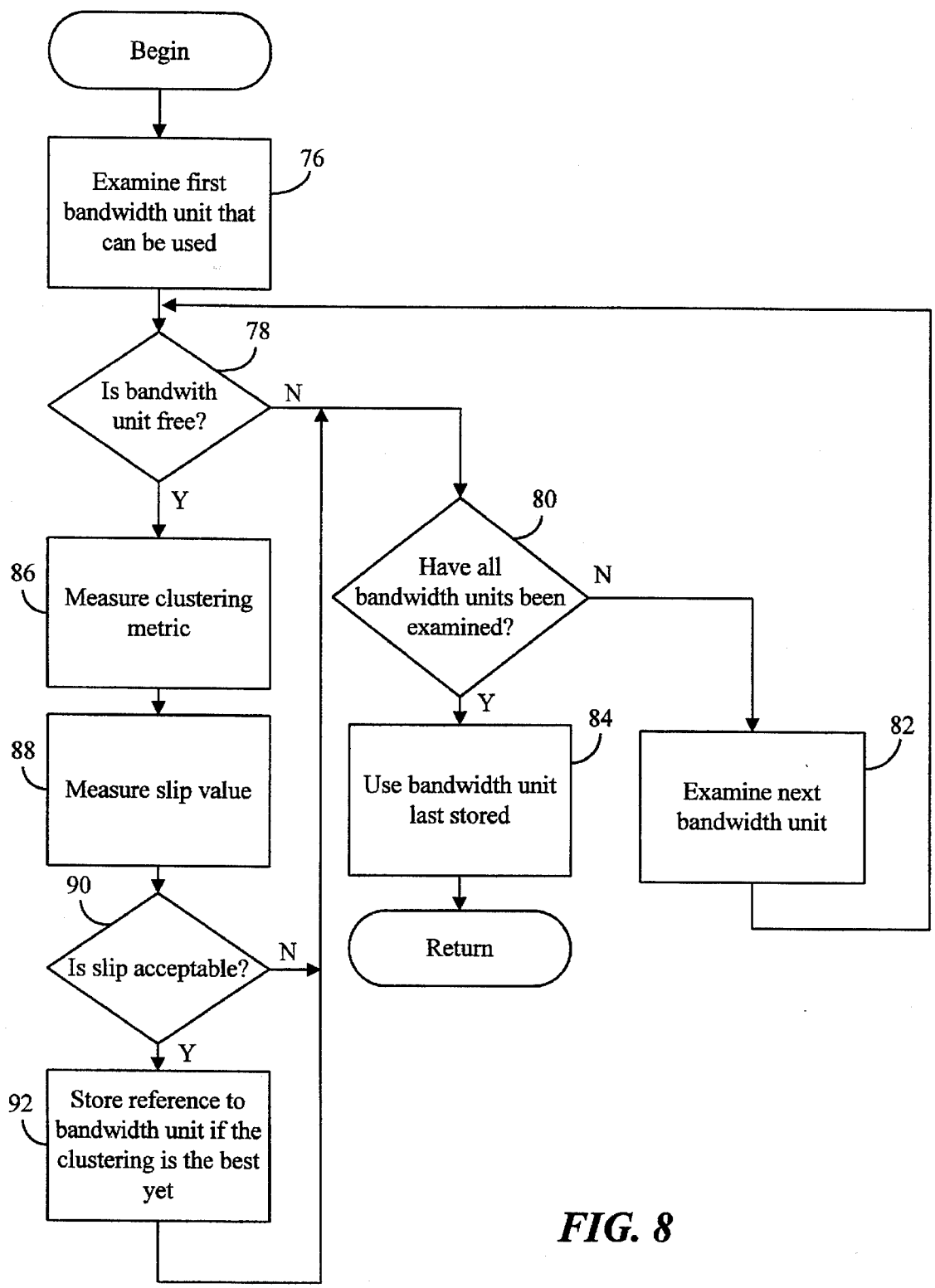
FIG. 8 is a flowchart illustrating the steps performed by a first preferred embodiment of the anti-clustering algorithm of the present invention.

FIGS. 8, 9A and 9B, and 10A and 10B depict three preferred embodiments of the ASA of the present invention. As shown in FIG. 8, the first step in selecting a free bandwidth unit by the first preferred embodiment is to perform a calculation to determine the first bandwidth unit that can be next used, given the current time frame. There is an inherent delay between when a free bandwidth unit is found and when the free bandwidth unit can actually be used to output video data which must be accounted for in the determination. In step 76 of FIG. 8, the first preferred embodiment accounts for clock granularity, communication delay to the interconnection network 12, and communication delay for blocks of video data to be read in locating the next bandwidth unit that should also be considered. Given this calculation, the present invention determines the first bandwidth unit that can be used to output the requested video image sequence to the subscriber (if the bandwidth unit is not already allocated). For example, in the schedule of FIG. 6, if bandwidth unit 3 were currently being serviced and the inherent delay were negligible, the first bandwidth unit that can be used is bandwidth unit 6. That is, after accounting for the inherent delay, bandwidth unit 6 is the temporally closest available bandwidth unit to the bandwidth unit currently being serviced. The found bandwidth unit is examined, and it is determined whether the bandwidth unit is free (step 78). Hence, the data structure 68 is examined for the found bandwidth unit to determine if it holds a null entry. If the entry for the found bandwidth unit holds a null entry, the first preferred embodiment measures the clustering metric of the schedule as if the found bandwidth unit were utilized (step 86). That is, the first preferred embodiment allocates the found bandwidth unit to the subscriber request, measures the clustering metric, and then deallocates the found bandwidth unit from the subscriber request. After measuring the clustering metric, the first preferred embodiment measures the slip value (step 88). The first preferred embodiment measures the slip value by determining the difference between the position of the first bandwidth unit that can be used (as determined in step 76) and the position of the bandwidth unit currently being evaluated. The first preferred embodiment then determines if the slip value is acceptable (step 90). This step is performed by comparing the slip value with an empirically proven acceptable slip value. If the slip value is acceptable, the first preferred embodiment stores a reference to the bandwidth unit if the clustering indicator for the bandwidth unit is the best yet (step 92). The reference stored refers to the relative position of the bandwidth unit in the schedule. After storing the reference or if, in step 90 the slip value was determined to be unacceptable, the first preferred embodiment continues to step 80. The first preferred embodiment then determines whether all bandwidth units have been examined (step 80). If it is determined that not all bandwidth units have been examined, the first preferred embodiment examines the next bandwidth unit (step 82) and continues to step 78. If, however, all of the bandwidth units have been examined, the first preferred embodiment uses the bandwidth unit referred to by the last stored reference (step 84). If no bandwidth units have been stored, the first preferred embodiment uses the free bandwidth unit with the least slip value, even if this slip value is unacceptably large.

The second preferred embodiment of the present invention utilizes a slip range. The "slip range" is a maximum slip value that is predetermined to be acceptable to the subscribers of the video-on-demand system. In using the slip range, the second preferred embodiment of the present invention only examines the bandwidth units within the slip range, thereby reducing the processing time of the ASA. In addition, the second preferred embodiment performs an optimization over calculating the clustering metric for the whole schedule. Instead, when evaluating a bandwidth unit, the second preferred embodiment determines a "delta clustering value," which is the effect that allocating a subscriber request to the bandwidth unit would have on the clusteriness of the schedule. After evaluating the available bandwidth units within the slip range, the available bandwidth unit with the least effect on the clusteriness of the schedule (the best delta clustering value) is selected. The delta clustering value is easily computed and thus leads to a reduction in processing time for the ASA.

The delta clustering value of the second preferred embodiment of the present invention is calculated by using four values: LF, RF, LE and RE. The LF value indicates a count of the number of unavailable bandwidth units that contiguously precede a bandwidth unit under evaluation. For example, with reference to FIG. 6, if the bandwidth unit under consideration were bandwidth unit 6, the LF value would be three. The RF value indicates a count of the number of unavailable bandwidth units that contiguously follow a bandwidth unit under evaluation. For example, if the bandwidth unit in FIG. 6 that was under evaluation were bandwidth unit 2, the RF value would be three. The LE value indicates a count of the number of available bandwidth units that contiguously precede the bandwidth unit under consideration and the RE value indicates a count of the number of available bandwidth units that contiguously follow the bandwidth unit under consideration. The calculation of the delta clustering value of the second preferred embodiment of the present invention is described in pseudo code in Code Table Number One.

---

Code Table Number One

LF=count of unavailable contiguously preceding bandwidth units;
RF=count of unavailable contiguously following bandwidth units;
LE=count of available contiguously preceding bandwidth units;
RE=count of available contiguously following bandwidth units;
Running_total=0;
Running_total=Running_total−LF*(LF+1)/2;
Running_total=Running_total−RF*(RF+1)/2;
Running_total=Running_total+(LF+RF+1)*(LF+RF+2)/2;
Running_total=Running_total−(LE+RE+1)*(LE+RE+2)/2;
Running_total=Running_total+LE*(LE+1)/2;
Running_total=Running_total+RE*(RE+1)/2;
delta clustering value=Running_total;

---

Figure 9A:
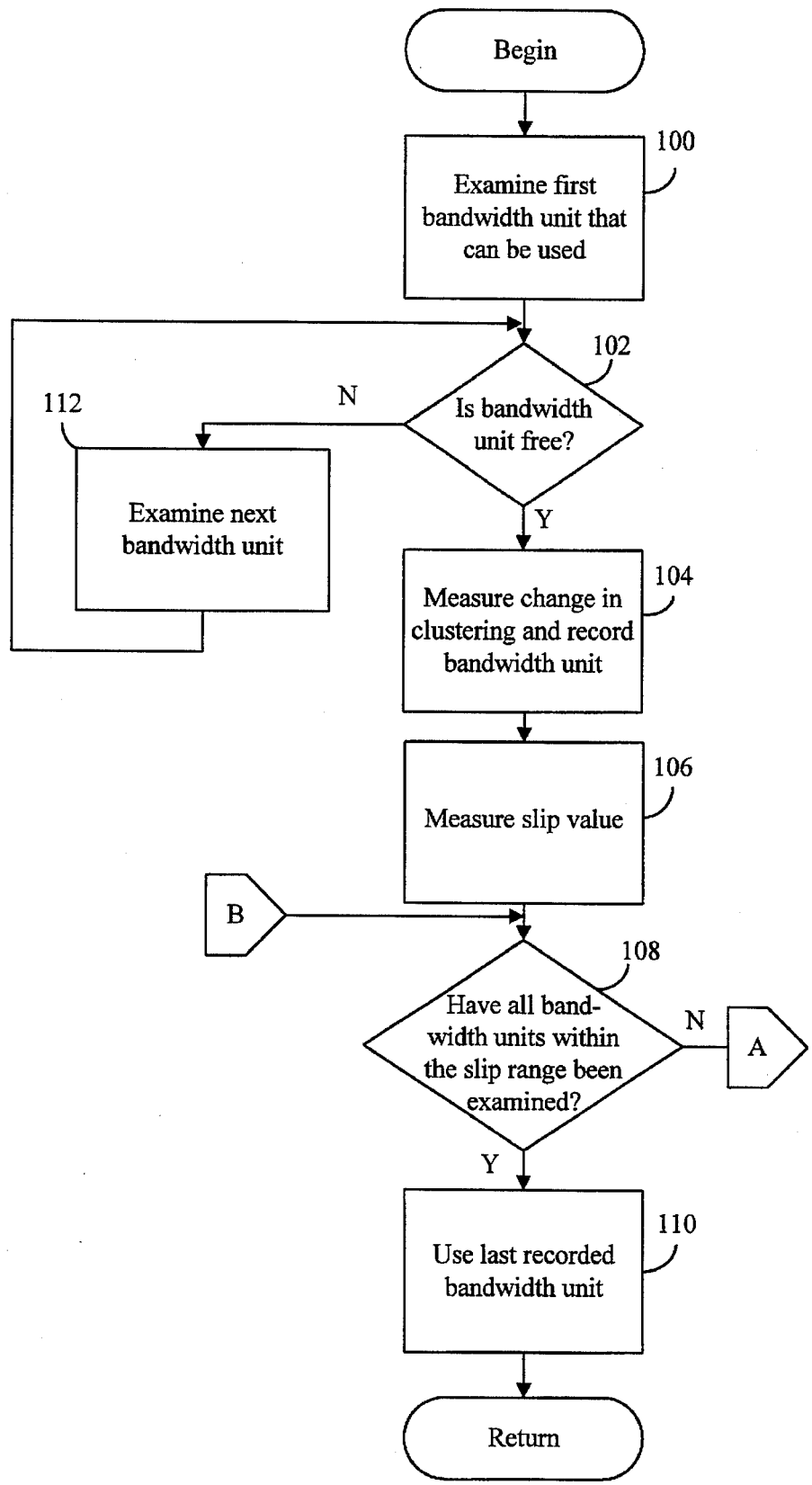
FIGS. 9A and 9B are a flowchart illustrating the steps performed by a second preferred embodiment of the anti-clustering algorithm of the present invention.
Figure 9B:
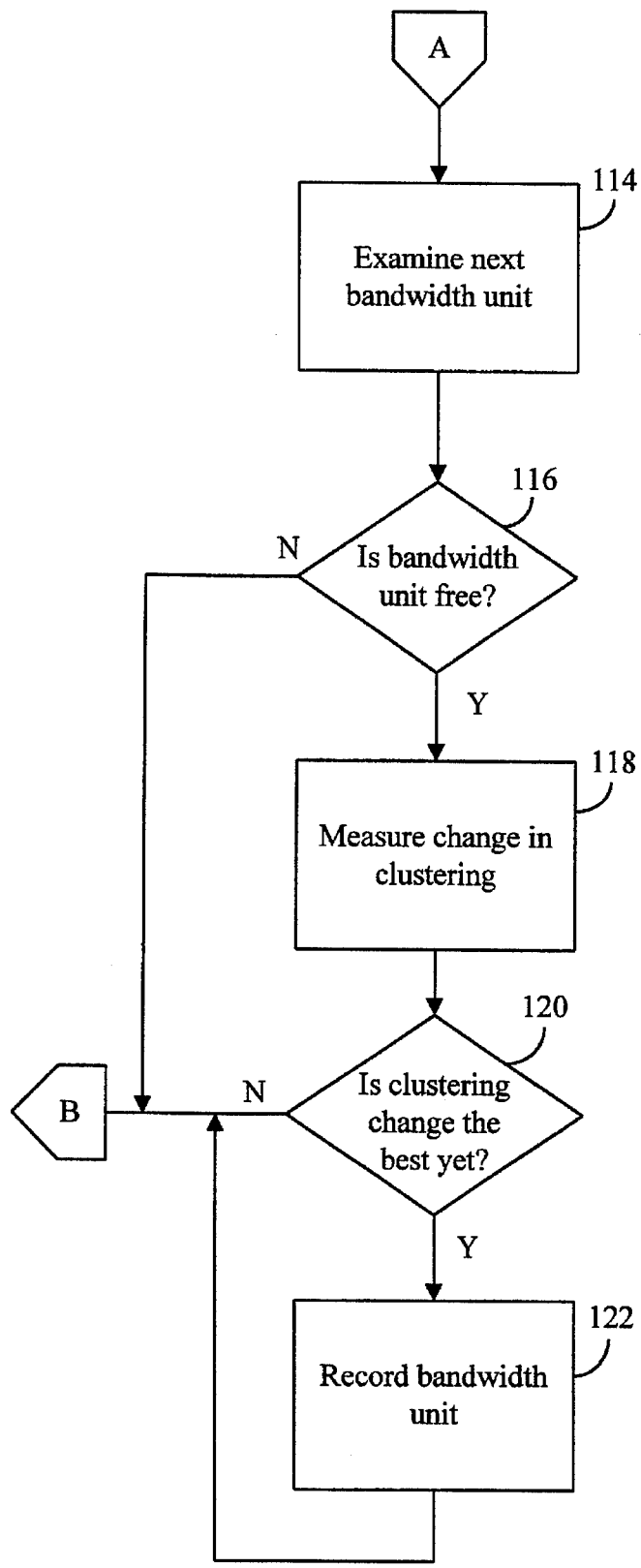

FIGS. 9A and 9B depict a flowchart illustrating the steps performed by a second preferred embodiment of the present invention. The first step of the second preferred embodiment of the present invention is to examine the first bandwidth unit that can be used (step 100). The processing of this step is similar to that as described relevant to step 76 of FIG. 8. The second preferred embodiment then determines whether the bandwidth unit is free (step 102), and, if not, examines the next bandwidth unit (step 112). After locating a free bandwidth unit, the second preferred embodiment calculates the delta clustering value and records a reference to the bandwidth unit (step 104). In this step, the second preferred embodiment calculates the delta clustering value of the schedule as if the bandwidth unit were allocated to the subscriber request. The second preferred embodiment then measures the slip value for the bandwidth unit (step 106). After measuring the slip value, the second preferred embodiment determines whether all bandwidth units within the slip range have been examined (step 108). If there are bandwidth units remaining to be examined, the second preferred embodiment examines the next bandwidth unit (step 114 in FIG. 9B). The second preferred embodiment then determines if the bandwidth unit is free (step 116). If the bandwidth unit is not free, processing continues to step 108, otherwise, the second preferred embodiment measures the delta clustering value (step 118). The second preferred embodiment measures the delta clustering value of the schedule as if the bandwidth unit were allocated to the subscriber request. After measuring the delta clustering value of the schedule, the second preferred embodiment of the present invention determines if the change in clustering is the best yet measured (step 120). If the change in clustering is not the best yet measured, processing continues to step 108, otherwise, processing continues to step 122 wherein the second preferred embodiment records a reference to the bandwidth unit. The reference to the bandwidth unit refers to the position of the bandwidth unit within the schedule. After recording the reference to the bandwidth unit, processing continues to step 108 where the second preferred embodiment determines whether all bandwidth units within the slip range have been examined. If all of the bandwidth units within the slip range have been examined, processing continues to step 110 where the second preferred embodiment uses the last recorded bandwidth unit (step 110). By utilizing the last recorded bandwidth unit, the second preferred embodiment ensures that the bandwidth unit with the best clustering value within the slip range is utilized. If no bandwidth unit within the slip range is free, the second preferred embodiment uses the free bandwidth unit with the least slip value, regardless of clustering.

The third preferred embodiment of the present invention is an optimization of the ASA by utilizing four arrays to calculate the delta clustering value. Each array has an entry for each bandwidth unit in the schedule. The first array, "rf," contains the number of unavailable bandwidth units immediately following a given bandwidth unit. The second array, "re," contains the number of available bandwidth units immediately following a given bandwidth unit. The third array, "lf," contains the number of unavailable bandwidth units immediately preceding a given bandwidth unit. The fourth array, "le," contains the number of available bandwidth units immediately preceding a given bandwidth unit. By utilizing the values in the four arrays, the third preferred embodiment can determine the delta clustering value more easily and faster than the method described relative to the second preferred embodiment. An example showing a schedule and the LF, RF, LE and RE arrays is described in example table number one.

| | Example Table One | | | |
|---|---|---|---|---|
| Bandwidth Unit | Schedule | LF | RF | LE | RE |
| 1 | Customer 10 | 0 | 1 | 1 | 0 |
| 2 | Customer 8 | 1 | 0 | 0 | 2 |
| 3 | Unassigned | 2 | 0 | 0 | 1 |
| 4 | Unassigned | 0 | 1 | 1 | 0 |
| 5 | Customer 2 | 0 | 0 | 2 | 3 |
| 6 | Unassigned | 1 | 0 | 0 | 2 |
| 7 | Unassigned | 0 | 0 | 1 | 1 |
| 8 | Unassigned | 0 | 1 | 2 | 0 |
| 9 | Customer 3 | 0 | 0 | 3 | 1 |
| 10 | Unassigned | 1 | 2 | 0 | 0 |

By utilizing the four arrays, the third preferred embodiment of the present invention can also achieve performance enhancements in three other areas. First, when the third preferred embodiment is examining an unavailable bandwidth unit and needs to examine the next available bandwidth unit, the third preferred embodiment merely adds one to the value in the "rf" array to find the position of the next available bandwidth unit. This saves the steps of having to examine each bandwidth unit in between. Second, when the third preferred embodiment is examining a group of contiguous available bandwidth units, the bandwidth unit which would render the least delta clustering value is found by adding (re–le)/2 to the position of the current bandwidth unit. This is based on the knowledge that allocation of the bandwidth unit nearest the center of a group of contiguous available bandwidth units will have the least negative affect on the clustering indicator, as compared to the other available bandwidth units in the group. Third, when the third preferred embodiment is examining an unassigned bandwidth unit and needs to examine the next unassigned bandwidth unit worthy of evaluation, the third preferred embodiment moves to a new position indicated by "re+1," determines the rf value at the new position and moves to "rf+1" to find the position of the next unassigned bandwidth unit worthy of evaluation.

Figure 10A:
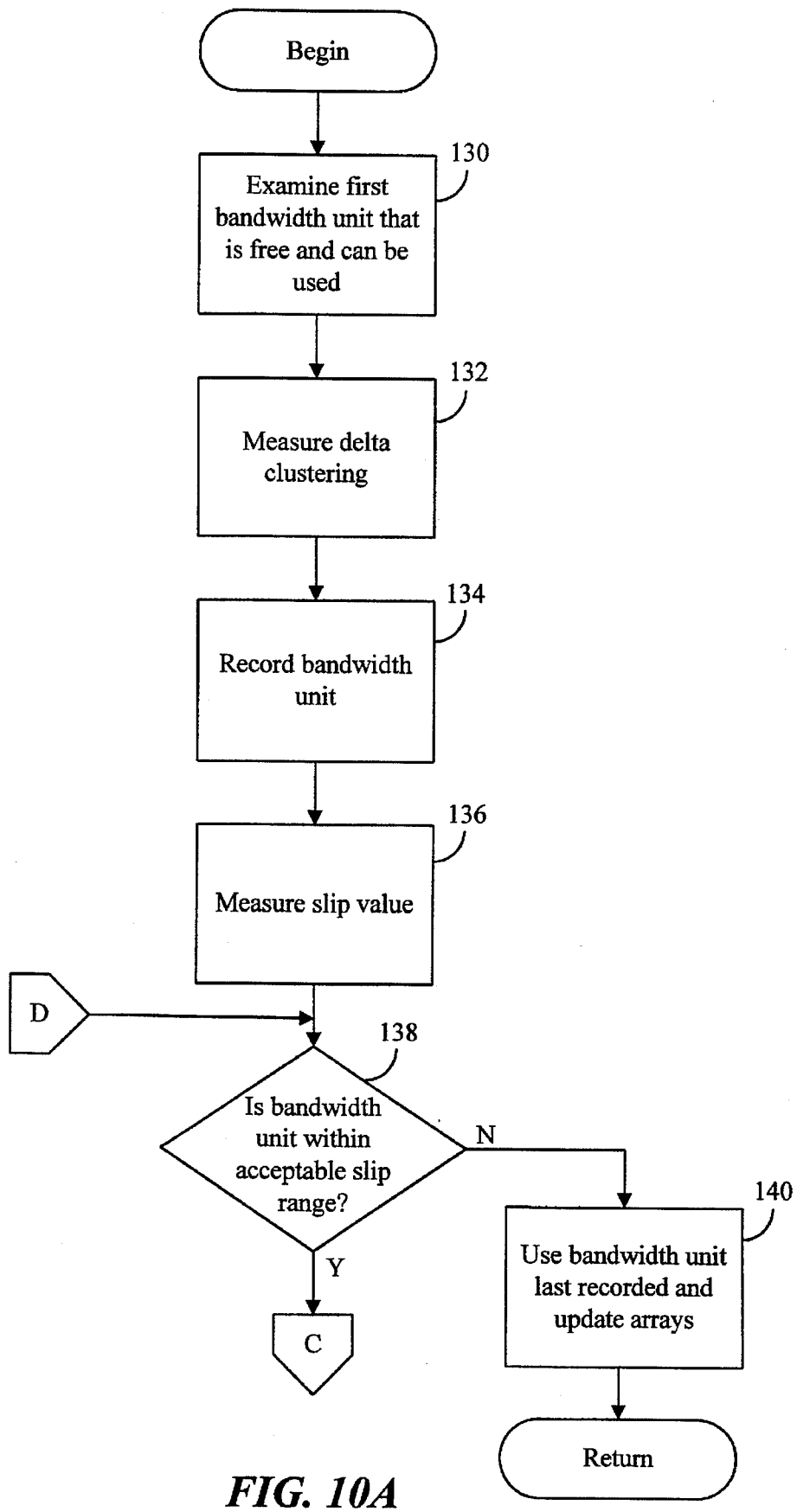
FIGS. 10A and 10B are a flowchart illustrating the steps performed by a third preferred embodiment of the anti-clustering scheduling algorithm of the present invention.
Figure 10B:
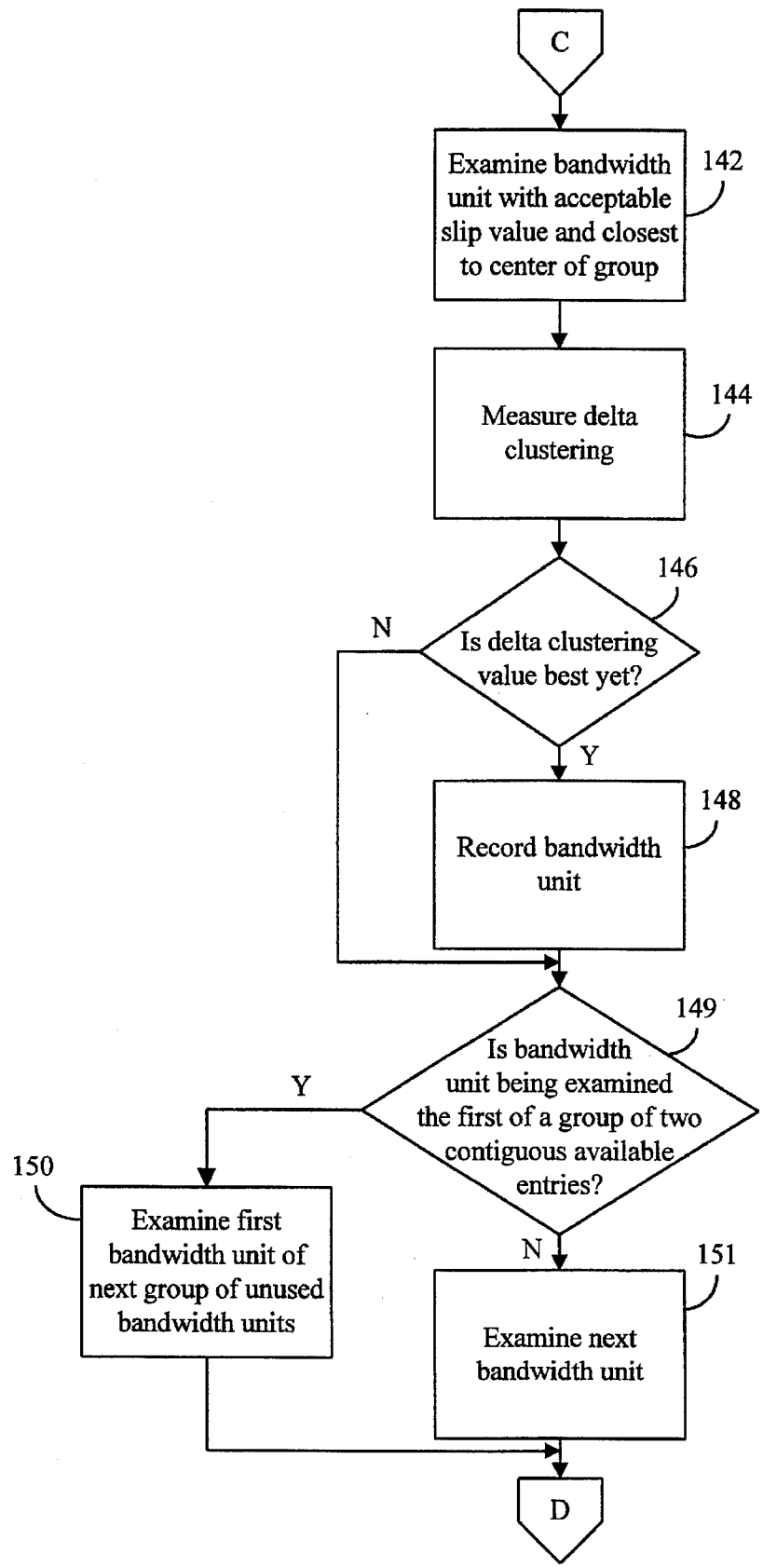

FIGS. 10A and 10B depict a flowchart of the steps performed by the third preferred embodiment of the present invention. The first step performed by the third preferred embodiment of the present invention is to examine the first bandwidth unit that is free and can be used (step 130). The processing performed by this step is similar to that of the processing performed relative to the steps 100, 102 and 112 of FIG. 9A. The third preferred embodiment then measures the delta clustering value for the bandwidth unit (step 132). Given the previous definition for "v(k)," the delta clustering value is measured as described in Code Table 2, where "p" refers to the position of the bandwidth unit currently under evaluation. All code provided herein is described using C++ pseudocode.

Code Table 2

```
int delta_clustering(p)
{
return
    – v(lf[p])              // remove cluster of previous
                            unavailable bandwidth units
    – v(rf[p])              // remove cluster of following
                            unavailable bandwidth units
    + v(lf[p] + rf[p] +1)   // account for newly allocated
                            bandwidth unit
    – v(le[p] + re[p] +1)   // remove cluster of available
                            bandwidth units
    + v(le[p])              // add cluster of previous available
                            bandwidth units
    + v(re[p]);             //add cluster of following available
                            bandwidth units
}
```

By substituting the formula for "v(k)" into the above function, an optimized function is obtained:

```
int delta_clustering(p)
{
return lf[p]*rf[p] + lf[p] + rf[p] – le[p]*re[p] – le[p] –re[p];
}
```

After measuring the delta clustering value, the third preferred embodiment records a reference to the bandwidth unit (step 134). The third preferred embodiment then measures the slip value for the bandwidth unit (step 136). After measuring the slip value, the third preferred embodiment determines whether the bandwidth unit is within the acceptable slip range (step 138). If the bandwidth unit is within the acceptable slip range, the third preferred embodiment examines the bandwidth unit with an acceptable slip value and closest to the center of the group of contiguous available bandwidth units (step 142). That is, from the position of the present bandwidth unit, the third preferred embodiment evaluates the bandwidth unit at (re–le)/2 from the position of the present bandwidth unit. Next, the third preferred embodiment measures the delta clustering value for the bandwidth unit at the new position (step 144). After measuring the delta clustering value, the third preferred embodiment determines whether the delta clustering value is the best yet measured (step 146). If the delta clustering value is the best yet measured, the third preferred embodiment records a reference to the bandwidth unit (step 148). If the delta clustering value is not the best yet measured or after recording the bandwidth unit, the third preferred embodiment determines if the bandwidth unit being examined is the first entry in a group of two contiguous available bandwidth units (step 149). If it is determined that the bandwidth unit being examined is the first of a group of two contiguous available bandwidth units, the third preferred embodiment examines the first bandwidth unit of the next group of available bandwidth units (step 150). Otherwise, the third preferred embodiment examines the next bandwidth unit (step 151). Next, the third preferred embodiment determines if the bandwidth unit is within the acceptable slip range. If the bandwidth unit is not within the acceptable slip range, processing continues to step 140 wherein the third preferred embodiment utilizes the bandwidth unit last recorded. In this step, the bandwidth unit last recorded is allocated to the subscriber request. After allocating the bandwidth unit, the values for the four arrays are updated to reflect the allocation of the bandwidth unit. Code Table 3 describes a function, "Update," that updates the values of the four arrays after an allocation has occurred; where "n" refers to the position of the bandwidth unit in the schedule allocated to the subscriber request.

Code Table 3

```
Update(n)
{
int i;
for (i = 0; i <= re[n]; i++) le[(n+i+1) % size] = i;
for (i = 0; i <= le[n]; i++) re[(size+n–i–1) % size]= i;
for (i = 1; i <= rf[n]+1; i++) lf[(n+i) % size] = lf[n]+i;
for (i = 1; i <= lf[n]+1; i++) rf[(size+n–i) % size] = rf[n]+i;
}
```

Those skilled in the art will appreciate that the present invention may also be applied to the writing of data onto storage devices from subscribers or other data sources. The same steps of dividing scheduling into bandwidth units are performed and during the allocated time slots data is written onto the storage devices rather than read from the storage devices.

While the present invention has been described with reference to a preferred embodiment thereof, those skilled in the art will appreciate the various changes in form and detail may be made without departing from the spirit and scope of the present invention as defined in the appended claims. For instance, other storage mediums may be used and different quantities of storage mediums may be used. In addition, the sequence of storage devices may vary from that shown. Still further, approaches to monitoring assignment of bandwidth units which differ from the linear list described above may be used. In addition, the approach of the present invention is also applicable to guaranteeing input bandwidth.

We claim:

1. In a system having a resource for servicing requests of a plurality of consumers to utilize the resource and a schedule having entries for allocation to the consumer requests, an entry being available when the entry is not allocated to a consumer request, the schedule having a clustering indicator for the available entries indicating a clusteriness of the schedule when an available entry is allocated to a consumer request, a method for scheduling a consumer request comprising the steps of:

determining the clustering indicator for the available entries in the schedule;

selecting the clustering indicator indicating a lowest clusteriness of the schedule; and allocating the consumer request to the available entry with the selected clustering indicator.

2. The method of claim 1 wherein the system is a video-on-demand system, wherein the resource is a storage device containing video image sequences, and wherein the consumer requests are for requesting video image sequences contained on the storage device.

3. The method of claim 1 wherein the system is a video-on-demand system, wherein the resource is a storage device containing video image sequences, and wherein the consumer requests are for storing video image sequences onto the storage device.

4. The method of claim 1 wherein the step of determining the clustering indicator includes the steps of:

for each available entry, allocating the available entry to the consumer request;

calculating the clustering indicator after allocating the available entry; and deallocating the available entry from the consumer request after calculating the clustering indicator.

5. The method of claim 4 wherein entries in the schedule are organized in sequence, wherein the schedule contains unavailable entries allocated to consumer requests, wherein the schedule has a group of sequentially contiguous unavailable entries and a group of sequentially contiguous available entries, wherein the step of calculating the clustering indicator includes the steps of:

examining the entries in the schedule;

determining the groups of sequentially contiguous unavailable entries and the groups of sequentially contiguous available entries in response to examining the entries; and calculating the clustering indicator in response to determining the groups of sequentially contiguous unavailable entries and the groups of sequentially contiguous available entries.

6. The method of claim 4 wherein entries in the schedule are organized in sequence, wherein the schedule contains unavailable entries allocated to consumer requests, wherein the schedule has a group of contiguous unavailable entries and a group of contiguous available entries, wherein each group of contiguous available entries and contiguous unavailable entries is contiguous in sequence and has an associated counter, wherein the step of determining the clustering indicator includes the steps of:

for each group of contiguous unavailable entries and contiguous available entries, for each entry in the group, adjusting the counter associated with the group; and calculating the clustering indicator by combining the counters.

7. In a system having a resource for servicing requests of a plurality of consumers to utilize the resource and a schedule having sequential entries for allocation to the consumer requests, an entry being available when the entry is not allocated to a consumer request, each entry having a slip indicator identifying an amount of time that a request allocated to the entry waits until being serviced, wherein the system has an acceptable time that the consumer requests can wait until being serviced, the schedule having a clustering indicator indicating a clusteriness of at least a portion of the schedule, a method for scheduling a consumer request comprising the steps of:

for each available entry in the schedule having a slip indicator within the acceptable time, determining the clustering indicator for the schedule if the request were allocated to the available entry;

storing the clustering indicator with a reference to the available entry;

selecting the stored clustering indicator indicating a lowest clusteriness of the schedule; and allocating the consumer request to the available entry referred to by the selected stored clustering indicator.

8. The method of claim 7 wherein the step of selecting the stored clustering indicator includes the steps of:

determining if there are available entries in the schedule having a slip indicator within the acceptable time; and when it is determined that there are available entries in the schedule having a slip indicator within the acceptable time, selecting the stored clustering indicator indicating a least clusteriness of the schedule, and wherein the step of allocating the consumer request includes the steps of:

when it is determined that there are available entries in the schedule having a slip indicator within the acceptable time, allocating the consumer request to the available entry referred to by the selected stored clustering indicator; and when it is determined that there are no available entries in the schedule having a slip indicator within the acceptable time, allocating the consumer request to an available entry with a least slip indicator.

9. The method of claim 7 wherein the system is a video-on-demand system, wherein the resource is a storage device containing video image sequences, and wherein the consumer requests are for requesting video image sequences contained on the storage device.

10. The method of claim 7 wherein the system is a video-on-demand system, wherein the resource is a storage device containing video image sequences, and wherein the consumer requests are for storing video image sequences onto the storage device.

11. The method of claim 7 wherein the schedule contains unavailable entries allocated to consumer requests, wherein the schedule has a group of sequentially contiguous unavailable entries and a group of sequentially contiguous available entries, wherein the step of determining the clustering indicator includes the steps of:

examining the entries in the schedule;

determining the groups of sequentially contiguous unavailable entries and the groups of sequentially contiguous available entries in response to examining the entries; and calculating the clustering indicator in response to determining the groups of sequentially contiguous unavailable entries and the groups of sequentially contiguous available entries.

12. The method of claim 7 wherein the schedule contains unavailable entries allocated to consumer requests, wherein the schedule has a group of sequentially contiguous unavailable entries and a group of sequentially contiguous available entries, wherein each group of sequentially contiguous available entries and sequentially contiguous unavailable entries has an associated counter, wherein the step of determining the clustering indicator includes the steps of:

for each group of sequentially contiguous unavailable entries and sequentially contiguous available entries, for each entry in the group, adjusting the counter associated with the group; and calculating the clustering indicator by combining the counters.

13. In a system having a resource for servicing requests of a plurality of consumers to utilize the resource and a schedule having entries for storing the consumer requests, an entry being available when the entry does not contain a consumer request, the schedule having a clustering indicator indicating a clusteriness of the schedule, the available entries having an associated value identifying a change in the clustering indicator of the schedule when a consumer request is stored in the available entry, a method for scheduling a consumer request comprising the steps of:

examining the associated values of the available entries in the schedule;

selecting an available entry with a smallest associated value identifying a least change in the clustering indicator; and storing the consumer request in the selected entry.

14. The method of claim 13 wherein the system is a video-on-demand system, wherein the resource is a storage device containing video image sequences, and wherein the consumer requests are for requesting video image sequences contained on the storage device.

15. The method of claim 13 wherein the system is a video-on-demand system, wherein the resource is a storage device containing video image sequences, and wherein the consumer requests are for storing video image sequences onto the storage device.

16. The method of claim 13 wherein the entries in the schedule are organized sequentially, wherein the schedule contains unavailable entries, wherein an unavailable entry stores a consumer request, wherein the schedule contains groups of sequentially contiguous unavailable entries and groups of sequentially contiguous available entries, wherein the associated values of the available entries comprise a plurality of values, wherein the step of examining the associated values includes the step of:

examining a first of the values that indicates a number of entries in a group of sequentially contiguous available entries that precedes the available entry;

examining a second of the values after examining the first value wherein the second value indicates a number of entries in a group of sequentially contiguous unavailable entries that precedes the available entry;

examining a third of the values after examining the second value wherein the third value indicates a number of entries in a group of sequentially contiguous available entries that follows the available entry;

examining a fourth of the values after examining the third value wherein the fourth value indicates a number of entries in a group of sequentially contiguous unavailable entries that follows the available entry; and combining the first value, the second value, the third value and the fourth value.

17. The method of claim 13, further including the steps of:

examining the schedule after storing the consumer request in the selected entry to determine available entries that precede the selected entry;

examining the schedule to determine available entries that follow to the selected entry; and updating the associated values of the available entries that precede the selected and the following available entries to reflect the storing of the consumer request in the selected entry.

18. A scheduling mechanism comprising:

a resource for servicing requests of consumers;

a list having a plurality of entries for maintaining the requests of the consumers and having a clustering indicator indicating the clusteriness of the list;

a selecting component for selecting an entry of the list to maintain a request to least affect the clustering indicator; and an allocating component for receiving a request from a consumer, for invoking the selecting component to select an entry and for allocating the consumer request to the selected entry.

19. The scheduling mechanism of claim 18 wherein the scheduling mechanism is part of a video-on-demand system.

20. In a system for scheduling consumer requests, the system having a resource for servicing requests of a plurality of consumers to utilize the resource and a schedule having entries for allocation to the consumer requests, an entry being available when the entry is not allocated to a consumer request, the available entries having a clustering indicator indicating a clusteriness of at least a portion of the schedule when an available entry is allocated to a consumer request and having a slip value for indicating an amount of time that a consumer request waits for servicing when allocated to the available entry, the system having a predefined value indicating an acceptable slip value, the system comprising:

means for receiving a consumer request for servicing by the resource;

means, responsive to receiving the consumer request, for measuring the clustering indicator for the available entries;

means, responsive to measuring the clustering indicator, for measuring the slip value for the available entries; and means, responsive to measuring the slip value, for allocating the consumer request to an available entry with a slip value less than the predefined value and with a least clustering indicator.

21. In a video-on-demand system having a storage device for servicing requests of a plurality of subscribers to receive video image sequences stored on the storage device and a schedule having bandwidth units for allocation to the subscriber requests, a bandwidth unit being available when the bandwidth unit is not allocated to a subscriber request, the schedule having a clustering indicator indicating a clusteriness of at least a portion of the schedule, the available bandwidth units having a slip value for indicating an amount of time that a subscriber request waits for servicing when allocated to the available bandwidth unit, the video-on-demand system having a predefined value indicating an acceptable slip value, a method for allocating a bandwidth unit to the subscriber request comprising the steps of:

for each bandwidth unit in the schedule,
    examining the bandwidth unit;
    determining whether the examined bandwidth unit is available after examining the bandwidth unit;
    when the bandwidth unit is available,
        allocating the bandwidth unit to the subscriber request;
        measuring the clustering indicator of the schedule after allocating the bandwidth unit;
        deallocating the bandwidth unit from the subscriber request after measuring the clustering indicator;
        measuring the slip value of the bandwidth unit after deallocating the bandwidth unit;
        determining whether the slip value is less than the predefined value after measuring the slip value;
        when the slip value is less than the predefined value, determining whether the bandwidth unit has a least clustering value;
            when the bandwidth unit has a least clustering value, selecting the bandwidth unit; and
allocating the selected bandwidth unit to the subscriber request.

22. The method of claim 21 wherein the step of allocating the selected bandwidth unit includes the steps of:
    determining if a bandwidth unit is selected;
    when it is determined that a bandwidth unit is selected, allocating the selected bandwidth unit to the subscriber request;
    when it is determined that a bandwidth unit is not selected,
        determining an available bandwidth unit with a least slip value; and
        allocating the determined bandwidth unit to the subscriber request.

23. In a video-on-demand system having a storage device for servicing requests of a plurality of subscribers to receive video image sequences stored on the storage device and a schedule having bandwidth units for allocation to the subscriber requests, a bandwidth unit being available when the bandwidth unit is not allocated to a subscriber request, the schedule having a clustering indicator indicating a clusteriness of at least a portion of the schedule, the available bandwidth units having a slip value for indicating an amount of time that a subscriber request waits for servicing when allocated to the available bandwidth unit, the video-on-demand system having a predefined value indicating an acceptable slip value, a method for allocating a bandwidth unit to the subscriber request comprising the steps of:

identifying the bandwidth units with a slip value less than the predefined value;
for the identified bandwidth units in the schedule,
    examining the bandwidth unit;
    determining whether the examined bandwidth unit is available after examining the bandwidth unit;
    when the bandwidth unit is available,
        allocating the bandwidth unit to the subscriber request;
        measuring the clustering indicator of the schedule after allocating the bandwidth unit;
        deallocating the bandwidth unit from the subscriber request after measuring the clustering indicator;
        determining whether the bandwidth unit has a least clustering value after deallocating the bandwidth unit;
        when the bandwidth unit has a least clustering value, selecting the bandwidth unit; and
allocating the selected bandwidth unit to the subscriber request.

24. The method of claim 23 wherein the step of allocating the selected bandwidth unit includes the steps of:
    determining if a bandwidth unit is selected;
    when it is determined that a bandwidth unit is selected, allocating the selected bandwidth unit to the subscriber request;
    when it is determined that a bandwidth unit is not selected,
        determining an available bandwidth unit with a least slip value; and
        allocating the determined bandwidth unit to the subscriber request.

25. In a video-on-demand system having a storage device for servicing requests of a plurality of subscribers to receive video image sequences stored on the storage device and a schedule having bandwidth units organized in a sequence for allocation to the subscriber requests, a bandwidth unit being available when the bandwidth unit is not allocated to a subscriber request, the schedule having groups of sequentially contiguous available bandwidth units and having a clustering indicator indicating a clusteriness of at least a portion of the schedule, the groups of sequentially contiguous available bandwidth units having a slip value for indicating an amount of time that a subscriber request waits for servicing when allocated to an available bandwidth unit within the group, each group of sequentially contiguous available bandwidth units having a center bandwidth unit being a bandwidth unit closest to the center of the group of available bandwidth units, the video-on-demand system having a predefined value indicating an acceptable slip value, a method for allocating a bandwidth unit to the subscriber request comprising the steps of:

determining the groups of sequentially contiguous available bandwidth units with a slip value less than the predefined value;
identifying the center bandwidth unit for each determined group of sequentially contiguous available bandwidth units;
for the identified bandwidth units in the schedule,
    measure the delta clustering value;
    determining whether the bandwidth unit has a least delta clustering value;
    when the bandwidth unit has a least delta clustering value,
        selecting the bandwidth unit; and
allocating the selected bandwidth unit to the subscriber request.

26. The method of claim 25 wherein the step of allocating the selected bandwidth unit includes the steps of:

determining if a bandwidth unit is selected;

when it is determined that a bandwidth unit is selected,
  allocating the selected bandwidth unit to the subscriber request;

when it is determined that a bandwidth unit is not selected,
  determining an available bandwidth unit with a least slip value; and
  allocating the determined bandwidth unit to the subscriber request.

27. A video demand system comprising:

a plurality of storage devices for storing video image sequences;

a receiver component for receiving consumer requests for the video image sequences on the storage devices; and a scheduling component further comprising:
  a schedule having a plurality of entries for maintaining the requests of the consumers and having a clustering indicator indicating a clusteriness of the schedule;
  a selecting component for selecting an entry in the schedule to maintain a request to least affect the clustering indicator; and
  an allocating component for receiving a consumer request from the receiver component, for invoking the selecting component to select an entry and for allocating the consumer request to the selected entry.

* * * * *